(12) United States Patent
Beckmann et al.

(10) Patent No.: US 7,207,600 B2
(45) Date of Patent: Apr. 24, 2007

(54) MODULAR CHASSIS FOR COMMERCIAL VEHICLES

(75) Inventors: Detlev Beckmann, Aichwald (DE); Karl-Heinz Grimm, Reutlingen (DE); Georg Stefan Hagemann, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 283 days.

(21) Appl. No.: 10/496,868

(22) PCT Filed: Oct. 4, 2002

(86) PCT No.: PCT/EP02/11147

§ 371 (c)(1),
(2), (4) Date: Mar. 16, 2005

(87) PCT Pub. No.: WO03/045760

PCT Pub. Date: Jun. 5, 2003

(65) Prior Publication Data

US 2006/0055162 A1    Mar. 16, 2006

(30) Foreign Application Priority Data

Nov. 27, 2001  (DE)  ................. 101 58 107

(51) Int. Cl.
*B62D 21/00* (2006.01)
(52) U.S. Cl. ............... 280/781; 280/124.109; 280/124.135; 180/311
(58) Field of Classification Search ........... 280/781, 280/124.109, 788, 124.135, 124.145, 124.154; 180/311, 312
See application file for complete search history.

(56) References Cited

U.S. PATENT DOCUMENTS 4,353,578 A * 10/1982 Knapp ................. 280/781

(Continued)

FOREIGN PATENT DOCUMENTS

DE    2930036 A1    2/1981

(Continued)

OTHER PUBLICATIONS

International Preliminary Examination Report from PCT/EP02/11147, with partial English translation.

(Continued)

*Primary Examiner*—Paul N. Dickson
*Assistant Examiner*—Timothy Wilhelm
(74) *Attorney, Agent, or Firm*—Crowell & Moring LLP

(57) ABSTRACT

A chassis of modular construction for commercial vehicles has a front vehicle subframe and a rear vehicle subframe connected thereto, an individual wheel suspension having a spring and/or shock-absorber strut and also an upper transverse link and a lower transverse link formed on the front vehicle subframe on each side of the vehicle. The front vehicle subframe is composed of two side consoles assigned in each case to one side of the vehicle, an upper crossmember connecting the two side consoles to each other at the top and a lower crossmember connecting the two side consoles to each other at the bottom. Each side console is connected to the rear vehicle subframe. One of the upper transverse links is mounted on each side console and one of the spring and/or shock-absorber struts is supported thereon. The two lower transverse links are mounted on the lower crossmember. Each side console has two lower ends one behind the other in the vehicle longitudinal direction, the lower crossmember connecting the four lower ends of the two side consoles to one another.

21 Claims, 3 Drawing Sheets

U.S. PATENT DOCUMENTS

| | | | |
|---|---|---|---|
| 4,815,556 A * | 3/1989 | Sumimoto et al. | 180/311 |
| 5,777,243 A * | 7/1998 | Kewish | 73/865.6 |
| 6,330,778 B1 * | 12/2001 | Jakobsson | 52/729.1 |
| 6,398,262 B1 * | 6/2002 | Ziech et al. | 280/785 |
| 6,516,914 B1 * | 2/2003 | Andersen et al. | 180/360 |
| 6,685,203 B1 * | 2/2004 | Bodin et al. | 280/124.109 |
| 6,733,021 B1 * | 5/2004 | Ziech et al. | 280/124.109 |
| 6,736,232 B1 * | 5/2004 | Bergstrom et al. | 180/292 |
| 6,755,461 B2 * | 6/2004 | Seksaria et al. | 296/193.04 |
| 6,786,295 B2 * | 9/2004 | Herrmann et al. | 180/312 |
| 6,866,295 B2 * | 3/2005 | Ziech et al. | 280/785 |
| 6,874,816 B2 * | 4/2005 | Herrmann et al. | 280/781 |

FOREIGN PATENT DOCUMENTS

| | | |
|---|---|---|
| DE | 4006418 A1 | 9/1991 |
| DE | 4032823 A1 | 4/1992 |
| DE | 4228314 A1 | 3/1994 |
| DE | 4234120 A1 | 4/1994 |
| DE | 19809281 A1 | 9/1999 |
| DE | 100 11 417 A1 | 9/2001 |
| WO | WO 01/23245 A1 | 4/2001 |

OTHER PUBLICATIONS

German office action from DE 101 58 107.6, with partial English translation.

* cited by examiner

MODULAR CHASSIS FOR COMMERCIAL VEHICLES

BACKGROUND AND SUMMARY OF THE INVENTION

The present invention relates to a chassis of modular construction for commercial vehicles, in particular for trucks.

A chassis of the type mentioned is disclosed in international PCT publication WO 01/23245 A1 and comprises a front vehicle subframe and a rear vehicle subframe connected thereto. An individual wheel suspension having a spring and/or shock-absorber strut and also having an upper transverse link and a lower transverse link is formed on the front vehicle subframe on each side of the vehicle. The front vehicle subframe is composed of two side consoles assigned in each case to one side of the vehicle, an upper crossmember connecting the two side consoles to each other at the top and a lower crossmember connecting the two side consoles to each other at the bottom. In this case, each side console is connected to the rear vehicle subframe, and one of the upper transverse links is mounted on each side console. The two lower transverse links are mounted on the lower crossmember. The side console has two lower ends one behind the other in the vehicle longitudinal direction, the lower crossmember connecting the four lower ends of the two side consoles to one another. In the case of the known chassis, the spring and/or shock-absorber struts are supported in each case on the upper crossmember. The front vehicle subframe is attached to the rear vehicle subframe via the side consoles which are connected in each case to a single-part longitudinal member of the rear vehicle subframe.

German publication DE 100 11 417 A1 discloses an individual wheel suspension for a steerable vehicle axle, which has wheel-guiding oblique links which mount the wheels in an articulated manner on wheel supports and the transverse and longitudinal link arms of which are situated below a horizontal plane passing through the centers of the wheels. In this case, the transverse link arms are configured to be longer in each case than half the track width. For this purpose, the respectively upper ends of the wheel supports are supported on the body side via transverse links, the body-side joints of the transverse link arms and the joints of the transverse links being mounted in an articulated manner on an auxiliary assembly frame. In the case of the known individual wheel suspension, a spring and/or shock-absorber strut is supported on a projection which projects in the direction of travel from a side console, the upper transverse link also being mounted on this side console. The bearings of the upper transverse link are offset inward.

Another chassis of modular construction is disclosed in German publication DE 40 32 823 A1 and has a front vehicle subframe which comprises two longitudinal members which run parallel to the vehicle longitudinal direction and are connected to each other via a plurality of crossmembers arranged one behind another in the vehicle longitudinal direction. A rear vehicle subframe connected to the front vehicle subframe supports a body which can be configured as a function of the type of commercial vehicle.

German publication DE 42 28 314 A1 discloses assembling the chassis from a central supporting framework, a bow-shaped front frame and a frame longitudinal-member assembly which supports the superstructures. In this case, the central supporting framework engages around the drive assemblies and is arranged essentially in the core shadow of the front wheels. This central supporting framework essentially comprises a tube which is bent in a U-shaped manner and engages around the drive assembly from below and laterally. The upwardly open U-tube is closed above the drive assembly by a rectilinear tube extending transversely to the vehicle longitudinal direction. Further tubes are welded laterally to this annularly closed frame section as side frames to which the front frame is attached. Longitudinal members of the frame longitudinal-member assembly are connected to the U-tube of the central supporting framework.

German publication DE 42 34 120 A1 discloses forming an underride protector in the front region of the chassis in a commercial vehicle, in particular in a truck. This underride protector is essentially formed by a lower bumper which is situated relatively low down and the height of which is matched to the height of bumpers of passenger vehicles and which is configured to be highly energy-absorbing in the event of a crash. The known underride protector is realized by the longitudinal members of the chassis opening out in the front region in a Y-shaped manner in a transverse view.

German publication DE 40 06 418 A1 discloses a commercial vehicle, the chassis of which has, in the front region of the vehicle, a radiator support which is fastened to longitudinal members of the chassis. At least one main radiator for the cooling circuit of the internal combustion engine of the vehicle is mounted on this radiator support. Furthermore, associated ventilation fans and further coolers and also peripheral devices may be mounted on this radiator support.

German publication DE 198 09 281 A1 shows a further chassis which is of modular construction in the front vehicle region and has a spring and/or shock-absorber strut on each side of the vehicle. The spring and/or shock-absorber struts are supported in each case on a side console. The consoles are connected to each other via a common lower crossmember and are fastened in each case to the outer side of a longitudinal member of the chassis.

German publication DE 29 30 036 A1 shows a further chassis having a modular construction, in which a housing for accommodating a spring strut is formed in the front vehicle region on each side of the vehicle, said housing being fastened in each case to a longitudinal member of the chassis. In addition, the two housings are connected to each other at their upper ends via a common upper crossmember.

The present invention is concerned with the problem of specifying an improved embodiment for a chassis of modular construction of the type mentioned at the beginning.

This problem is solved by a chassis having the features claimed, with advantageous embodiments being the subject matter of dependent claims.

The invention is based on the general concept of assembling the front vehicle subframe from two side consoles assigned in each case to one side of the vehicle, an upper crossmember connecting the two side consoles to each other at the top and a lower crossmember connecting the two side consoles to each other at the bottom, with at least essential components of the individual wheel suspensions being mounted or supported on the side consoles. This proposal makes it possible for the front vehicle subframe to be of particularly stiff design, in particular of torsion-resistant design. A front vehicle subframe which is rigid or stiff in this respect can absorb the torsional moments of the wheel and spring forces and can keep the structures which are connected to the front vehicle subframe, in particular the rear vehicle subframe, free from these torsional moments.

The producibility of the front vehicle subframe can be simplified by the side consoles and/or the upper crossmember and/or the lower crossmember being designed as sheet-metal shaped parts.

A compact construction for the front vehicle subframe can be achieved if each side console has an inner side which faces the other side console, and the upper transverse links are in each case mounted on this inner side of the respective side console and extend outward through an opening left open in the side console.

The compact construction of the front vehicle subframe is also assisted by each side console having, between its lower ends, a recess through which the respective lower transverse link and/or a steering drive for the steering operation of the steerable vehicle wheels and/or a drive shaft for driving drivable vehicle wheels extend.

Further important features and advantages of the invention emerge from the subclaims, from the drawings and from the associated description of the figures with reference to the drawings.

It goes without saying that the features mentioned above and those which have yet to be explained below can be used not only in the combination specified in each case, but also in other combinations or on their own without departing from the scope of the present invention.

A preferred exemplary embodiment of the invention is illustrated in the drawings and is explained in greater detail in the following description where the same reference numbers refer to identical or functionally identical or similar components.

BRIEF DESCRIPTION OF THE DRAWINGS

The drawings, in each case schematically, show certain views.

DETAILED DESCRIPTION OF THE INVENTION

Figure 1:
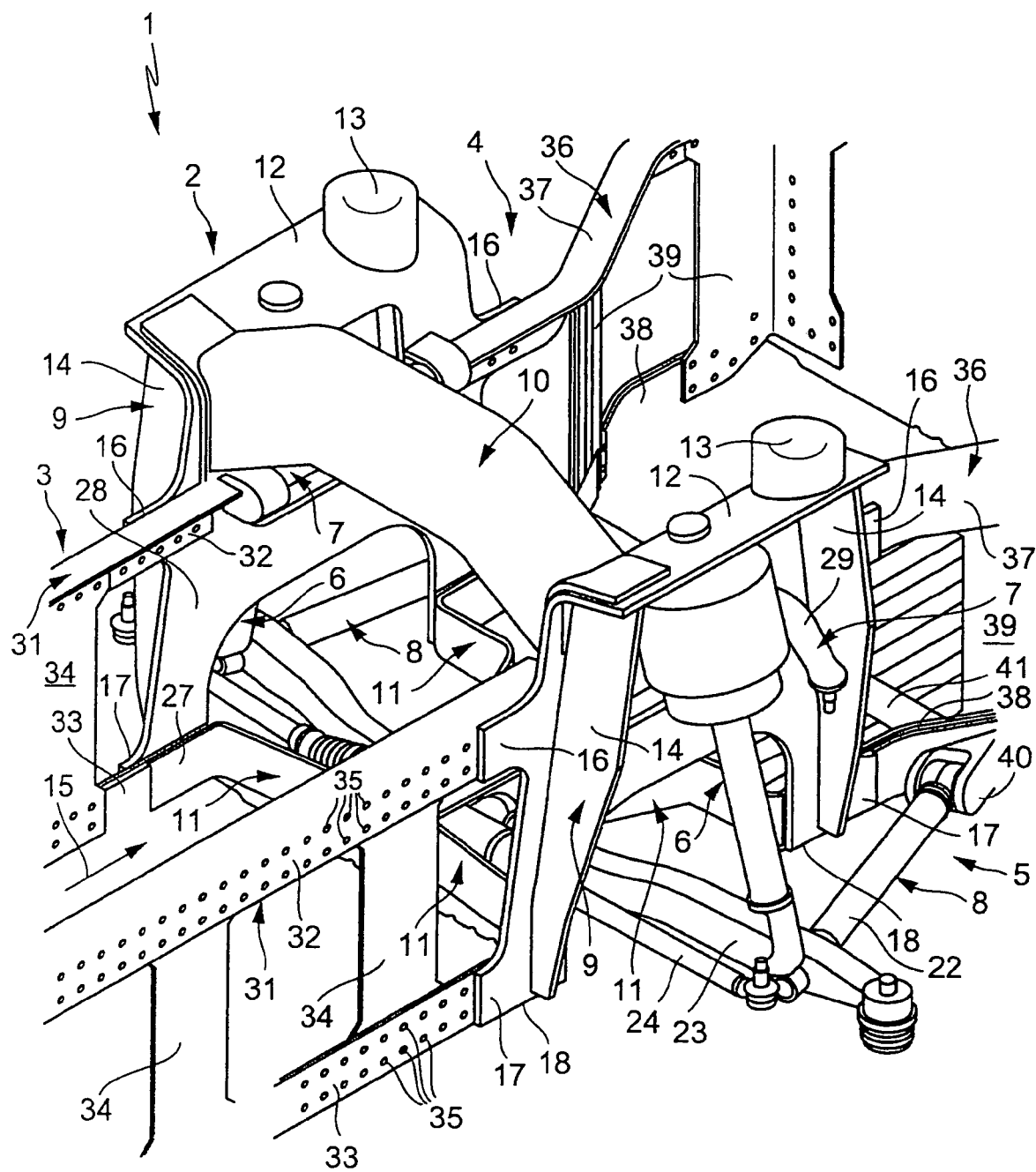
FIG. 1 shows a perspective view of a cutout of a chassis according to the invention in the region of a front vehicle subframe.

According to FIG. 1, a chassis 1 (only part of which is illustrated) of a commercial vehicle comprises a front vehicle subframe 2 and a rear vehicle subframe 3. Furthermore, a front-end vehicle subframe 4 is additionally provided here. The front-end vehicle subframe 4 is fastened to the front vehicle subframe 2 which, for its part, is fastened to the rear vehicle subframe 3. The individual subframes 2, 3 and 4 are designed as modules, so that they can be assembled in particular independently of one another. Furthermore, the modular construction permits the combination of different embodiments of the individual subframes 2, 3 and 4, in particular via standardized intersecting points. For example, the front vehicle subframe 2 can be combined with different rear vehicle subframes 3 which differ from one another by means of their length, for example. Furthermore, the rear vehicle subframe can be designed with regard to certain types of commercial vehicle, for example dump truck, semitrailer towing vehicle or platform truck, while the front vehicle subframe 2 can always be of identical construction for these types of commercial vehicle.

The front vehicle subframe 2 has an individual wheel suspension 5 on each side of the vehicle, the suspensions comprising a spring and/or shock-absorber strut 6, an upper transverse link 7 and a lower transverse link 8 on each side of the vehicle.

The front vehicle subframe 2 comprises two side consoles 9 which are assigned in each case to one side of the vehicle. The two side consoles 9 are connected to each other on their upper side via an upper crossmember 10 and on their lower side via a lower crossmember 11. The front vehicle subframe 2 is therefore composed of at least these four individual parts 9, 10, 11.

The side consoles 9 are designed as sheet-metal shaped parts and their upper ends have a top section 12 which is angled and projects outward. The respective spring and/or shock-absorber strut 6 is supported on this top section 12 of the associated side console 9. Furthermore, the top sections 12 in each case support a rear driver's cab bearing 13 on top. Each side console 9 has, in order to stiffen it, side cheeks 14 which are welded on, for example, and support the projecting top section 12. On the side consoles 9, an upper connecting flange 16 and a lower connecting flange 17 are respectively formed on a front side and on a rear side, with respect to a vehicle longitudinal direction symbolized by an arrow 15, the connecting flanges being respectively used to connect the side consoles 9 to the rear vehicle subframe 3 and to the front-end vehicle subframe 4. The connecting flanges 16 and 17 are preferably configured in such a manner that the front vehicle subframe 2 can be connected to the rear vehicle subframe 3 and/or to the front-end vehicle subframe 4 via screw connections.

On the lower side the side consoles 9 have two ends 18 which are arranged one behind the other in the vehicle longitudinal direction 15. The lower connecting flanges 17 are formed here at these lower ends 18. It is of particular importance in this connection that the lower crossmember 11 is connected on each side of the vehicle at the two lower ends 18 to the respective side console 9. This results in the front vehicle subframe 2 being extremely stiff, so that it has, in particular, a high torsion resistance. A high torsional strength makes it possible to absorb the torsional moments introduced in the driving mode into the front vehicle subframe 2 via the wheel forces and spring forces without significant distortions occurring within the front vehicle subframe 2. This ensures that the rear vehicle subframe 3 is not stressed by these torsional moments.

Figure 2:
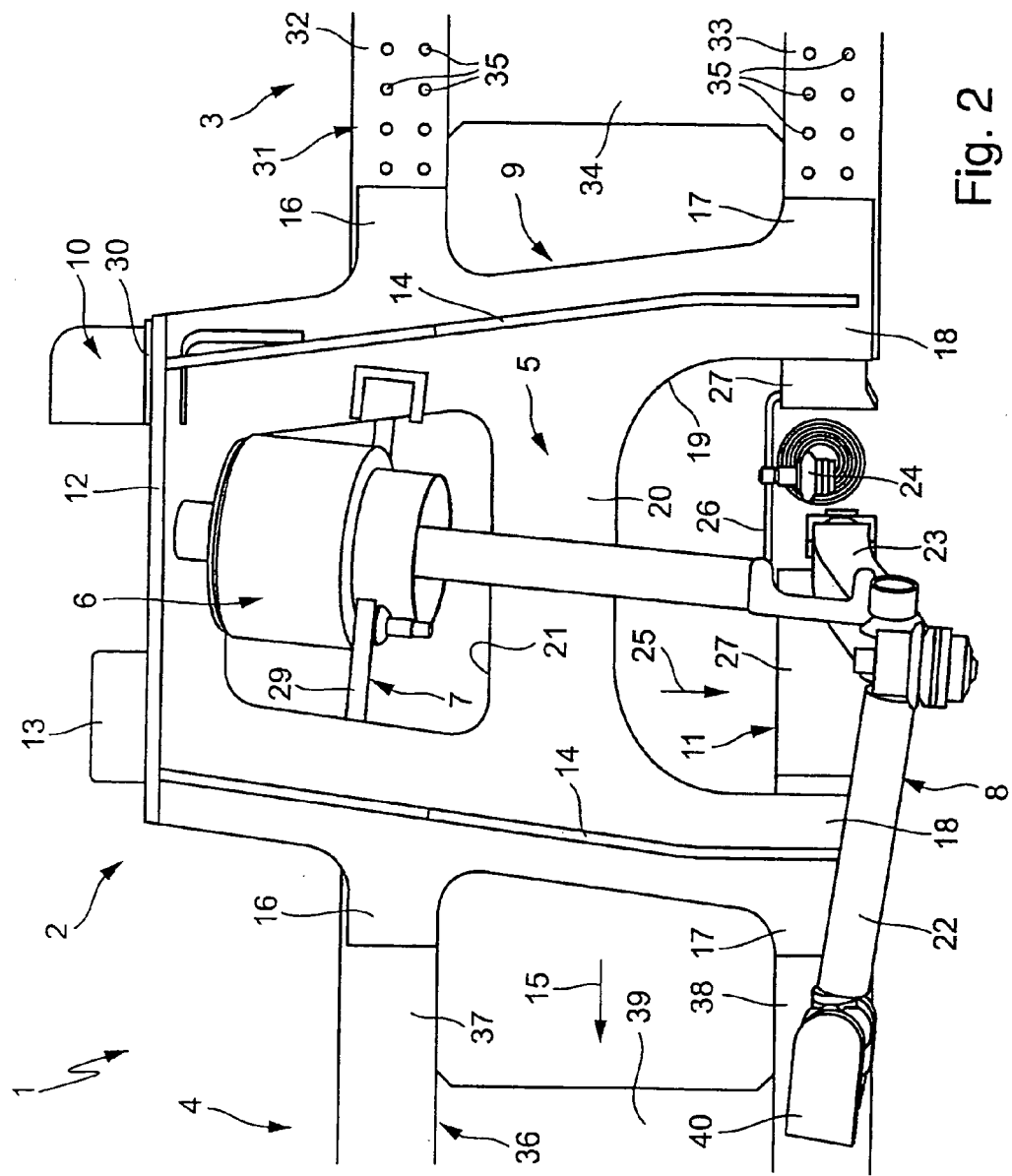
FIG. 2 shows a side view in the region of the front vehicle subframe.

In accordance with the side view according to FIG. 2, the side consoles are A-shaped or shaped in the manner of a gateway or of an archway and taper upward. Accordingly, the side consoles 9 are designed, at least in a lower section, such that they are open downward in a U-shaped manner, so that the side consoles 9 have a recess 19 at the bottom, between their lower ends 18. In addition, an opening 21 is formed in the respective side console 9 in an upper section separated from the recess 19 by a web 20.

As is particularly clear from FIG. 2, the lower crossmember 11 extends approximately level with the lower ends 18 of the side consoles 9. The lower transverse link 8 is designed as a triangular transverse link and accordingly has a front limb 22 and a rear limb 23. While the front link 22 is mounted on the front-end vehicle subframe 4, the rear limb 23 is mounted on the lower crossmember 11. In this case, the rear limb 23 extends through the recess 19. In the present exemplary embodiment, the vehicle wheels (not illustrated) which are mounted on the front vehicle subframe 2 with the aid of the individual wheel suspensions 5 are steerable vehicle wheels. A steering drive 24 for the steering operation of these steerable vehicle wheels likewise extends through the recess 19. The steering drive 24 can likewise be supported and/or mounted on the lower crossmember 11.

If, in addition, the wheels mounted on the front vehicle subframe 2 are drivable wheels, a corresponding drive shaft for driving these drivable vehicle wheels can expediently be arranged in such a manner that it likewise extends through the recess 19.

According to one preferred embodiment, the lower crossmember 11, in a viewing direction which is symbolized by an arrow 25 in FIG. 2 and is directed from top to bottom, can be of essentially X-shaped or H-shaped design. Accordingly, the lower crossmember 11 has a central part 26 from which four arms 27 lead out virtually in the shape of a star. While each arm 27 is connected to one of the lower ends 18 of the side consoles 9, the rear limbs 23 of the lower transverse links 8 are mounted on the central part 26. The lower crossmember 11 is expediently also designed as a sheet-metal shaped part.

The side consoles 9 have mutually facing inner sides 28 (cf. FIG. 1). The upper transverse links 7 are mounted on these inner sides 28, one limb 29 of the respective upper transverse link 7 extending outward in the direction of the vehicle wheel through the opening 21. This mounting on the inner side 28 enables a particularly compact construction to be achieved.

Figure 3:
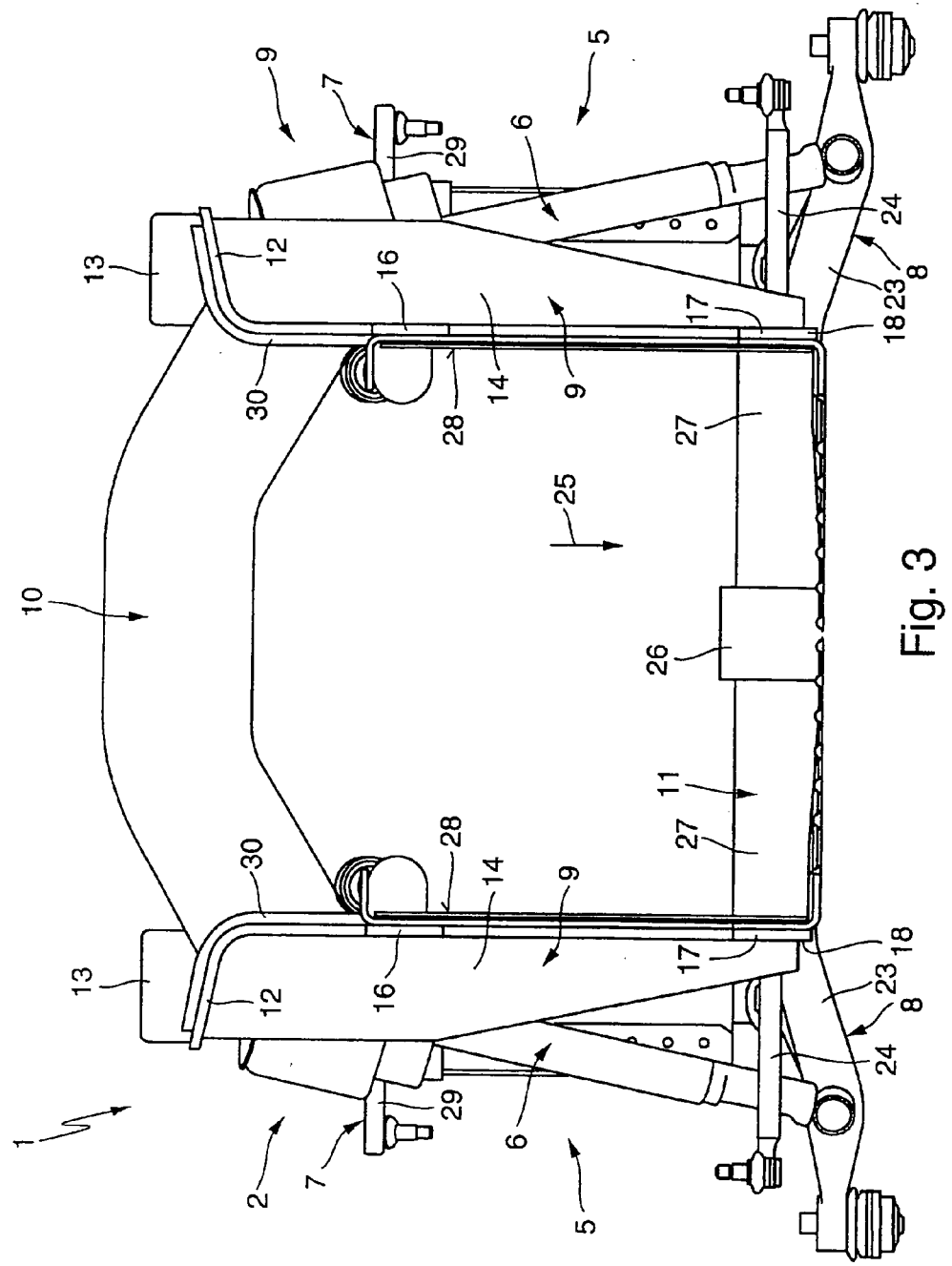
FIG. 3 shows a view in the vehicle longitudinal direction of the front vehicle subframe.

The upper crossmember 10 extends in a curved or bow-shaped manner transversely to the vehicle longitudinal direction 15, cf., for example, FIG. 3. The upper crossmember 10 is fixedly connected by flanges 30 to the side consoles 9, in particular by means of a welding connection. The upper crossmember 10 may also be designed as a sheet-metal shaped part.

According to FIGS. 1 and 2, the rear vehicle subframe 3 essentially comprises two longitudinal members 31 running parallel to the vehicle longitudinal direction 15. Each longitudinal member 31 is composed of an upper cord 32, a lower cord 33 and a plurality of connecting webs 34, the connecting webs 34 in each case connecting the upper cord 32 and lower cord 33 to each other. Furthermore, crossmembers (not shown here) may be provided in order to additionally stiffen the rear vehicle subframe 3. The cords 32 and 33 bear a pattern of holes 35 which simplifies the assembly of the rear vehicle subframe 3. This pattern of holes 35 is also used for the joining of the front vehicle subframe 2 by the connecting flanges 16 and 17 of the side consoles 9 bearing a corresponding pattern of holes. The front vehicle subframe 2 is expediently joined to the rear vehicle subframe 3 in the region of the lower connecting flanges 17 in such a manner that the connecting flanges 17 bear against the lower cord 33, in each case against an outer side thereof, while the arms 27 of the lower crossmember 11 bear against the lower cord 33, in each case against an inner side thereof. The lower cord 33 is then as it were clamped between the lower connecting flange 17 and an angled section of the arm 27.

The front-end vehicle subframe 4 can have side parts 36 which are composed in each case of an upper cord 37, a lower cord 38 and a plurality of connecting webs 39. The front limbs 22 of the lower transverse links 8 are mounted on these side parts 36 in the region of the lower cord 38. For this purpose, a bearing 40 is flange-mounted on the outside. A stiffening tube 41 or the like can be arranged on the inside in the region of this bearing 40, the tube extending transversely to the vehicle longitudinal direction 15 and supporting transverse forces.

In a section facing away from the front vehicle subframe 2, the front-end vehicle subframe 4 can form and/or have an underride protector (not explained specifically). As an alternative or in addition, the front-end vehicle subframe 4 can form or have, at its front end, a radiator support which is likewise not illustrated specifically here and has, for example, a radiator for a cooling circuit of an internal combustion engine.

The front vehicle subframe 2 and the front-end vehicle subframe 4 are expediently assembled independently of the rear vehicle subframe 3 and connected to each other, as a result of which a unit which can be integrated separately from the rear vehicle subframe 3 is produced. This unit can be integrated to a relatively high degree of completion; in particular, the front wheel steering, if appropriate a drive assembly, a transmission and the entire cooling circuit may be integrated in this unit. It is of particular advantage here that, in particular, the steering components can be set even before the front vehicle subframe 2 is fitted on the rear vehicle subframe 3. This means that the steering components are adjusted to basic settings. On account of the space required for this, this process can be carried out particularly easily as long as the front vehicle subframe 2 has not yet been fitted on the rear vehicle subframe 3. This keeps the complex setting processes away from the final assembly, i.e. the attachment of the front vehicle subframe 2 including the front-end vehicle subframe 4 to the rear vehicle subframe 3, thus optimizing the working sequence.

The linking of the drive assembly, the transmission and the cooling circuit into the pre-assembly also has the advantage that necessary first fillings with auxiliary substances, e.g. coolant, engine oil and transmission oil, can already be realized in the scope of the pre-assembly, which simplifies the final assembly.

With regard to the vehicle longitudinal direction 15, the upper crossmember and the lower crossmember 11 are arranged one above the other essentially in a relatively short axial section, as a result of which a completely closed, annular frame is formed in this axial section, therefore conferring particularly high stiffness values on the front vehicle subframe 2.

The invention claimed is:

1. A chassis of modular construction for commercial vehicles, comprising:
   a front vehicle subframe composed of two side consoles assigned in each case to one side of a vehicle, an upper crossmember connecting the two side consoles to each other at the top, and a lower crossmember connecting the two side consoles to each other at the bottom,
   a rear vehicle subframe connected to the front vehicle subframe and having two longitudinal members which run parallel to a vehicle longitudinal direction and which in each case are composed of an upper cord, a lower cord and connecting webs connecting them, and
   individual wheel suspensions, each of said individual wheel suspensions having a spring and/or shock-absorber strut, an upper transverse link, and a lower transverse link formed on the front vehicle subframe on a side of the vehicle,
   wherein one of the upper transverse links is mounted on each side console,
   wherein the two lower transverse links are mounted on the lower crossmember,
   wherein each side console has two lower ends one behind the other in the vehicle longitudinal direction,
   wherein the lower crossmember connects four lower ends of the two side consoles to one another,
   wherein one of the spring and/or shock-absorber struts is supported on each side console, and wherein each side console has an upper connecting flange which is connected to the upper cord and a lower connecting flange which is connected to the lower cord.

2. The chassis as claimed in claim 1, wherein the side consoles are designed as sheet-metal shaped parts.

3. The chassis as claimed in claim 1, wherein the upper end of each side console has an outwardly angled and projecting top section on which a respective spring and/or shock-absorber strut is supported.

4. The chassis as claimed in claim 1, wherein each side console has an inner side which faces the other side console, and wherein each of the upper transverse links is mounted on the inner side of a respective side console and extends outward through an opening left open in the side console.

5. The chassis as claimed in claim 1, wherein the side consoles, viewed in a vehicle transverse direction, are designed such that they are open downward in a U-shaped or an A-shaped manner.

6. The chassis as claimed in claim 1, wherein the lower crossmember, viewed from top to bottom, is of X-shaped or H-shaped design, with four arms of the lower crossmember being connected to the lower ends of the side consoles and with the lower transverse links being mounted on a central part of the crossmember.

7. The chassis as claimed in claim 1, wherein each side console has, between its lower ends, a recess through which a respective lower transverse link extends.

8. The chassis as claimed in claim 7, wherein a steering drive for a steering operation of steerable vehicle wheels extends through the recess.

9. The chassis as claimed in claim 7, wherein a drive shaft for driving drivable vehicle wheels extends through the recess.

10. The chassis as claimed in claim 1, wherein the side consoles, on sides facing away from the rear vehicle subframe, are connected to a front-end vehicle subframe.

11. The chassis as claimed in claim 10, wherein each of the lower transverse links is designed as a triangular transverse link with a front limb and a rear limb, the front limb being mounted on the front-end vehicle subframe while the rear limb is mounted on the lower crossmember.

12. The chassis as claimed in claim 1, wherein the upper end of each side console supports a rear driver's cab bearing.

13. The chassis as claimed in claim 1, wherein the front vehicle subframe forms a unit which can be fitted and adjusted independently of the rear vehicle subframe and is connected to the rear vehicle subframe in order to assemble the chassis.

14. The chassis as claimed in claim 10, wherein the front vehicle subframe together with the front-end vehicle subframe forms a unit which can be fitted and adjusted independently of the rear vehicle subframe and is connected to the rear vehicle subframe in order to assemble the chassis.

15. The chassis as claimed in claim 1, wherein at least one of the upper crossmember and the lower crossmember is designed as a sheet-metal shaped part.

16. The chassis as claimed in claim 2, wherein at least one of the upper crossmember and the lower crossmember is also designed as a sheet-metal shaped part.

17. The chassis as claimed in claim 10, wherein the front-end vehicle subframe forms at least one of an underride protector and a radiator support.

18. The chassis as claimed in claim 10, wherein the front-end vehicle subframe has at least one of an underride protector and a radiator support.

19. The chassis as claimed in claim 11, wherein the front vehicle subframe together with the front-end vehicle subframe forms a unit which can be fitted and adjusted independently of the rear vehicle subframe and is connected to the rear vehicle subframe in order to assemble the chassis.

20. The chassis as claimed in claim 17, wherein the front vehicle subframe together with the front-end vehicle subframe forms a unit which can be fitted and adjusted independently of the rear vehicle subframe and is connected to the rear vehicle subframe in order to assemble the chassis.

21. The chassis as claimed in claim 18, wherein the front vehicle subframe together with the front-end vehicle subframe forms a unit which can be fitted and adjusted independently of the rear vehicle subframe and is connected to the rear vehicle subframe in order to assemble the chassis.

* * * * *